United States Patent [19]

Shannon, Jr. et al.

[11] Patent Number: 5,218,340
[45] Date of Patent: Jun. 8, 1993

[54] AUDIBLE TURN SIGNAL CANISTER UNIT

[76] Inventors: Malcolm L. Shannon, Jr., 6199 South Jamaica Ct.; James W. Heller, 6090 South Jamaica Ct., both of Englewood, Colo. 80111

[21] Appl. No.: 748,975
[22] Filed: Aug. 23, 1991

Related U.S. Application Data

[63] Continuation-in-part of Ser. No. 537,693, Jun. 14, 1990, abandoned.

[51] Int. Cl.[5] .............................................. B60Q 1/26
[52] U.S. Cl. ................................... 340/475; 340/474; 340/457; 307/10.8
[58] Field of Search ............... 340/457, 463, 468, 474, 340/475, 472; 307/10.8

[56] References Cited

U.S. PATENT DOCUMENTS

| | | | |
|---|---|---|---|
| 2,210,619 | 8/1940 | Farrand | 177/339 |
| 2,896,190 | 7/1959 | Gallaro et al. | 340/474 |
| 2,958,071 | 3/1959 | Siefke | 340/474 |
| 3,315,226 | 11/1964 | Fernekes | 340/474 |
| 3,806,868 | 4/1974 | Portman | 340/475 X |
| 3,964,019 | 6/1976 | Wethe et al. | 340/474 |
| 4,754,566 | 6/1988 | Fluhr et al. | 340/474 |
| 4,933,665 | 6/1990 | Bull et al. | 340/457 |

Primary Examiner—Jin F. Ng
Assistant Examiner—Jeffery A. Hofsass
Attorney, Agent, or Firm—Dorr, Carson, Sloan and Peterson

[57] ABSTRACT

An audible turn signal canister unit for automobiles incorporates an audible alarm in the form of a unitary, self-contained module which can be plugged into the existing socket in the automobile in place of a standard flasher unit. The alarm is a pure tone in the mid-speech frequency range (e.g. 1000 to 2500 Hz) in order to be more readily heard over background noise or by hearing impaired individuals. Optionally, the unit can be provided with a time delay circuit in the form of an electronic counter that is reset each time that the turn signal switch is turned on or closed in order to establish the beginning count for the activation of the alarm a predetermined time interval after the turn signal unit is activated.

12 Claims, 2 Drawing Sheets

AUDIBLE TURN SIGNAL CANISTER UNIT

RELATED APPLICATION

This application is a continuation-in-part of the applicants' co-pending U.S. patent application Ser. No. 07/537,693, filed on Jun. 14, 1990, now abandoned.

BACKGROUND OF THE INVENTION

1. Field of the Invention

This invention relates to turn signals for motor vehicles; and more particularly relates to a novel and improved self-contained turn signal flasher unit incorporating a time delay and audible alarm within a common housing to emit an audible tone within the optimal hearing range of the driver which can be more easily heard in the presence of road noise or by persons with impaired hearing.

2. Statement of the Problem

Turn signal circuits are now provided as original equipment on virtually every type of motor vehicle and operate on essentially the same principle; namely, movement of a lever on a steering column will, through a flasher unit, cause a directional light on the automobile to blink at a predetermined rate so as to signal traffic that a turn is intended and, after completing the turn, the flasher unit is automatically canceled when the steering column returns to its original position. There are occasions when the turn signal unit is activated to indicate an intended turn and the turn is not completed or at least not to a degree sufficient to cancel the flashing signal when the turn is completed, and the driver thereafter fails to manually disengage the flasher unit. Not only is this a source of annoyance to other drivers but can create an unsafe condition in misleading other drivers into believing that a car is turning when in fact the turn signal has been accidentally left on. The audible clicking noise resulting from activation of the blinker circuit has proven to be of little value, since it is a type of sound that is difficult to hear for those with impaired hearing or when extraneous noise is present, such as for example, congested traffic areas or when the radio is playing.

Efforts have been made to overcome this problem by utilization of buzzers or bell tones and, for example, reference is made to U.S. Pat. Nos. 2,958,071 to Siefke and 2,896,190 to Gallaro, et al. Another reference of interest is U.S. Pat. No. 2,210,619 to Farrand for utilizing audible signals which are intended to be activated simultaneously with visual signal lights. Still another approach is disclosed in U.S. Pat. No. 3,315,226 to Fernekes in which an armature will cause a striker arm to engage the outer casing of the unit to warn the operator that the turn signal is in operation. In U.S. Pat. No. 3,964,019 to Wethe, et al., an audible alarm is employed in series with an SCR for use in a turn signal circuit, and a timing circuit is utilized in conjunction with the brake switch in the vehicle so that activation of the alarm is delayed in the event that turning is delayed by traffic or a traffic signal. U.S. Pat. No. 3,806,868 to Portman also discloses plural timing circuits with an audio frequency oscillator for use in conjunction with a standard flasher unit to provide a continuous audio tone or buzzer after a preset delay following activation of the turn signal. U.S. Pat. No. 4,933,665 to Bull, et al., discloses a turn signal non-return indicator which activates an audible alarm. The Bull device apparently requires at least three tap wires for interconnection with the turn signal circuitry of the automobile. Alternatively an adapter is employed between the existing socket and the flasher unit. U.S. Pat. No. 4,754,256 to Fluhr, et al., discloses another type of audible turn signal device housed in a self-contained plug-in module for releasable insertion into an adapter socket in the top of a flasher unit.

3. Solution to the Problem

The systems described suffer from a number of drawbacks, among which are the inability to produce a pure tone audible alarm in the optimal hearing range and which can be easily heard by persons with mild hearing loss notwithstanding the presence of extraneous noise factors. By "pure tone" is meant a single frequency tone in sinusoidal waveform. Moreover, systems of the type described which employ audible alarm circuits must be permanently wired into the motor vehicle and are not available as a part of a unitary, self-contained module that can be plugged directly into the socket provided for a conventional turn signal flasher canister. In this relation, it is highly desirable that the alarm be capable of being directly incorporated into the flasher circuit and be sufficiently compact that it can be combined with the flasher circuit in a common housing or canister without increasing its size for direct replacement of the standard turn signal canister units. These features facilitate upgrading of the turn signal systems of existing vehicles to incorporate this pure-tone safety feature for the relatively low cost of the new flasher unit itself. Replacement requires no mechanical or electrical skill beyond unplugging the existing turn signal canister and inserting the new unitary, self-contained module into the existing socket.

SUMMARY OF THE INVENTION

It is therefore an object of the present invention to provide for a novel and improved turn signal unit which is specifically adaptable for use in motor vehicles.

Another object of the present invention is to provide in a turn signal unit for a novel and improved audible alarm which is capable of producing a pure tone audio signal in the optimal hearing range and which can be more easily heard in the presence of road noise and/or by persons with impaired hearing.

It is a further object of the present invention to provide for a turn signal unit incorporating a novel and improved audible alarm circuit which will sound if the turn signal is left on for a predetermined period of time.

It is a still further object of the present invention to provide in a turn signal flasher unit to be used in automobiles for an audible alarm circuit which can be incorporated as a part of a turn signal circuit into a single module which will replace the conventional turn signal module and can be plugged into the same socket.

In accordance with the present invention, an audible alarm circuit has been devised which can be incorporated in a standard turn flasher circuit of an automobile or other motor vehicle and produces a pure tone at a frequency and intensity level which can be easily heard by the driver. Preferably, this frequency is in the range of 1000 KHz to 2500 KHz, which is the middle of the speech range; and, further, a time delay circuit is incorporated as a part of the alarm circuit to activate the alarm at a predetermined interval of time after the flasher circuit has been activated.

Broadly, the present invention resides in a directional signal circuit for motor vehicles wherein the car battery is connected in series to a turn signal switch, turn signal lamp(s) and a bimetallic thermal switch, the improved alarm circuit according to the present invention comprising audible alarm tone generator in parallel with the thermal switch and which is capable of producing a pure tone in the middle of the speech range, and activating means for activating the tone generator in response to the turn signal switch being closed, for example, when the turn signal lever in the motor vehicle is manually engaged to signal a turn in either desired direction. The audible alarm may additionally include a time delay circuit which is operative to delay the activation of the tone generator a predetermined time interval after the turn signal switch has been closed. The time delay is determined by counting the number of pulses produced as the thermal switch opens and closes. A power-up reset circuit is provided to assure that a counter is reset each time that the turn signal switch is turned on.

The circuitry described is preferably designed as a part of a self-contained module which is the same size as and can be used as a direct replacement for standard flasher units by plugging into the same socket in the motor vehicle. The module is self-contained in the sense that the time delay circuit is powered from a storage capacitor. The capacitor is charged through the flasher electrical contacts. It does not require wiring to the motor vehicle battery or other electrical contacts. Other objects, advantages and features of the present invention will become more readily appreciated and understood when taken together with the following detailed description in conjunction with the accompanying drawings.

DETAILED DESCRIPTION OF THE INVENTION

Figure 1:
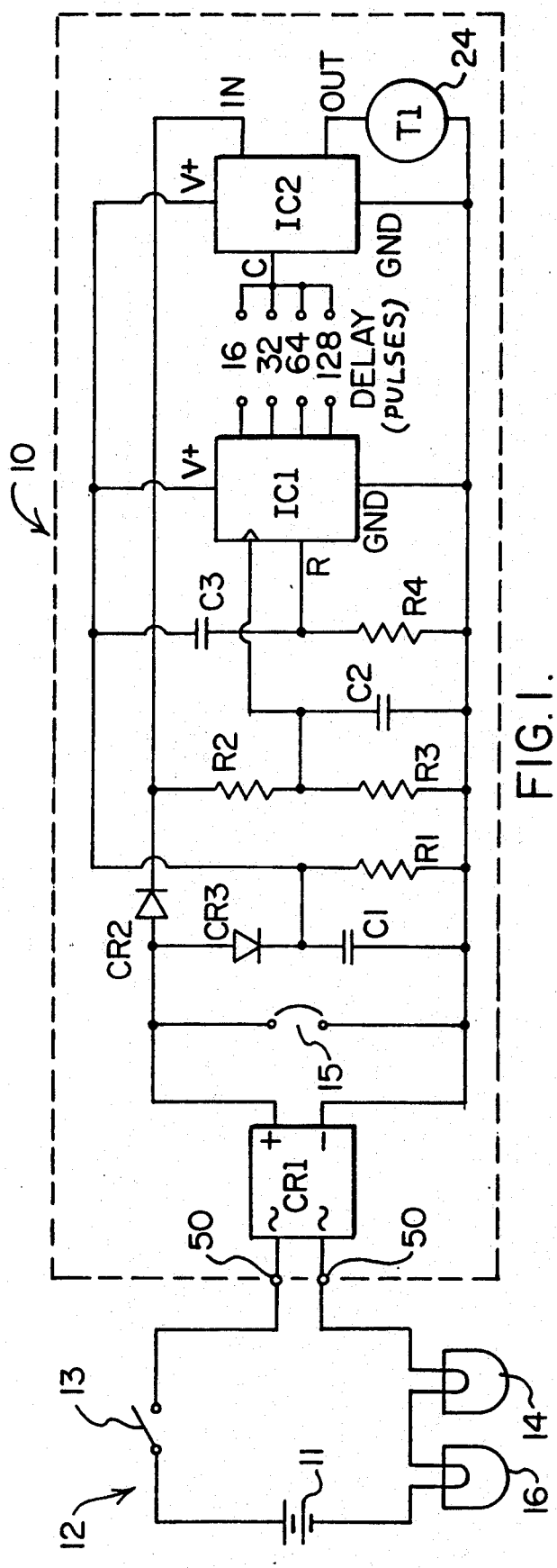
FIG. 1 is a schematic circuit diagram of the preferred form of audible alarm circuit in accordance with the present invention, and simplified relevant motor vehicle turn signal circuitry.

Referring in more detail to the drawings, there is illustrated in FIG. 1 a preferred form of audible alarm circuit 10 in combination with a conventional turn signal circuit 12. As a setting for the present invention, the turn signal circuit 12 comprises a turn signal switch 13, and one or more turn signal lamps 14 connected in series with a car battery 11.

In a conventional automotive arrangement, a bimetallic thermal switch 15 is also connected in series with the remaining components of the turn signal circuit 12. The bimetallic thermal switch 15 has a strip which is heated by a small resistance-type heater winding. After approximately 1 to 2 seconds, it flexes to open the circuit thereby causing the turn signal lamp to turn off. When the strip cools, typically in 1 to 2 seconds, it again flexes and returns to its original closed position. This action opens and closes contacts to complete and interrupt the turn signal lamp 14 and the indicator lamp 16. A "click" is heard each time that the strip flexes between the closed and open positions which also serves to remind the driver that the turn signal is operating. An indicator lamp 16 affords a visual alarm in the form of blinking directional lights, either right or left, on the dashboard of the vehicle. The bimetallic thermal switch 15 is commonly housed in a separate canister with two metal prongs extending from its base for appropriate electrical connection into a plug-in socket provided for this purpose in the automobile.

The present invention provides an audible alarm circuit 10 that fits within a canister and can be readily retrofitted for use in combination with a conventional turn signal circuit 12 by replacing the existing bimetallic thermal switch canister. The canister has two metallic prongs 50 that serve as input terminals for the audible alarm circuit 10. The size, shape and relative locations of these prongs are substantially the same as for the existing bimetallic switch canister to permit direct replacement.

A bridge rectifier CR1 is connected across the input terminals 50 to make the audible alarm circuit 10 independent of the polarity of the input terminals 50 (i.e. to allow for different vehicle wiring conventions). A continuous power supply for the integrated circuits IC1 and IC2 in the audible alarm circuit 10 is provided by capacitor C1 and diode CR3. Briefly, the bimetallic thermal switch 15 functions as previously described to cyclically open and close when the turn signal switch 13 is closed. The capacitor C1 charges when the thermal switch 15 is open (i.e., when the turn signal lamp 14 is off). The diode CR3 prevents current flow from the capacitor C1 through the thermal switch 15 when the switch is closed and the turn signal lamp 14 is on; and the capacitor C1 powers the delay circuit when the thermal switch 15 is closed (i.e., when the turn signal lamp 14 is on). The values for the capacitor C1 and resistor R1 are selected to yield an RC time constant such that the input voltage to the alarm circuit 10 is maintained above the minimum operational level between flashes.

In the preferred form of the alarm circuit 10, an electronic counter IC1 controls a switch IC2 which is in series with a tone generator 24. Alternatively, a transistor or other means may be used to switch the tone generator. The counter IC1 includes a reset circuit consisting of resistor R4 and capacitor C3. Preferably, the counter IC1 is a CMOS binary type. Each input clock pulse corresponds to a flash of the turn signal lamp 14. This type of counter has a number of outputs, each of which activate after a different number of input clock pulses. For a binary counter, these are in powers of 2 (i.e., 2, 4, 8, 16, 32, etc.). The selection of output determines the actual time delay. The time period after which to activate the tone generator 24 should be a period of sufficient length to assure normal time periods of intentional turn signal use (e.g. while waiting at a stop light). For instance, if the activation period is too short, it may cause the driver of the car to turn the signal circuit off when still needed if the alarm circuit is annoying to the driver. The reset circuit consisting of the resistor R4 and capacitor C3 provides a brief pulse to the reset pin of the counter IC1 in order to reset the counter when the turn signal lever switch 13 is turned on and power is applied to the circuit 10. In addition, resistor R1 rapidly discharges the capacitor C1 when the turn signal lever switch 13 is turned off. This insures proper reset of the count in the event the operator should then immediately turn the turn signal lever switch 13 on again. In the absence of these components, the starting count of the counter IC1 would be unpredictable each time that the turn signal circuit is turned on.

A pulse-shaping circuit, defined by resistor R3 and capacitor C2 in series with resistor R2, is connected to the clock input of the counter IC1 and operates to eliminate any switch "bounce" or other transient signals that may occur at the switch 15 or emanate from other locations in the vehicle. In other words, the pulse-shaping network will assure one, and only one, count for each flash of the turn signal lamp 14. In some applications, it may be possible to assure accurate counting and functioning of the tone generator in response to switching of the turn signal lamp 14 without the pulse-shaping network as described. In this connection, an advantage of utilizing a digital counting circuit IC1 as described is the simplification and reduction of the cost of individual components which are less critical and less interrelated than, for example, an RC timing circuit. The diode CR2 protects the switch IC2 from input signals greater than its supply voltage (V+) which can damage the switch. All unused pins on the switch IC2 should be grounded to negative power supply line to reduce and control the circuit current drain. Otherwise, erratic operation of the power-up reset will result.

Figure 5:
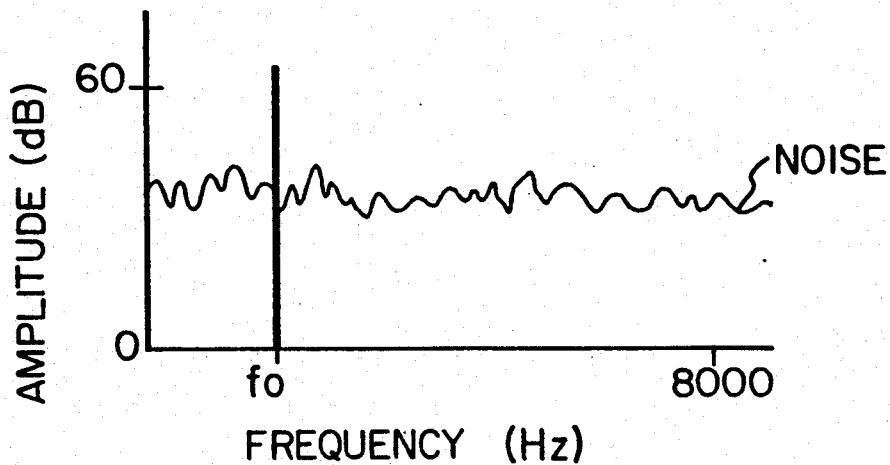
FIG. 5 is a graph representative of the spectrum of background noise present in a typical moving vehicle superimposed upon the signal produced by the alarm circuit.

FIG. 5 is a graph illustrating the wide frequency spectrum of background noise present in a typical moving vehicle. The engine, tires, and wind in a moving vehicle create an audible broad-band noise consisting of many frequencies in the audio spectrum. Broad-band noise is known to be an effective masking agent. That is, other sounds are more difficult to perceive in its presence. Persons with hearing losses often have an even more difficult time in detecting sounds in the presence of broad-band noise. Conventional turn signal flashers produce a "click" sound. This, in itself, is a type of short-duration noise. Detecting a click in the presence of continuous noise is very difficult and requires a large differential amplitude between the click and the background noise. By contrast, a pure tone (i.e. a sound having a single frequency) is much more readily detected in the presence of broad-band noise and therefore requires a relatively low amplitude over the background noise. This is due to the tonotopic organization of the cochlea and the fact that sounds of different frequencies are delivered to different nerve endings within the cochlea. Therefore, the tone generator 24 in the present invention produces a tone primarily at a single audible frequency that effectively cuts through the background noise as depicted in FIG. 5. In other words, the intensity level required for a pure tone to be audible in the presence of background noise is less than is required for a "click".

In addition to selecting a pure tone, the frequency of the tone generator 24 is critical. The frequency must be below the range where high frequency sensorineural hearing losses (presbycusis) generally occur. It should also be above the low frequency vibrations occuring in an automobile. Signals in the general range of 1000 Hz to 2500 Hz are therefore optimal.

In the preferred embodiment, the tone generator 24 is a prepacked oscillator/transducer circuit suitable to produce a clear, audible tone at a single frequency in the middle of the speech range (e.g., on the order of 1000 Hz to 2500 Hz.). An electromagnetic transducer, such as a speaker or buzzer can be used. Alternatively, a piezoelectric transducer can be used. The selection of the tone generator 24 is important also from the standpoint of enabling the construction of an extremely compact alarm circuit to be connected into a conventional turn signal circuit substantially within the same space and in the same socket formerly occupied by the turn signal flasher circuit alone.

Figure 2:
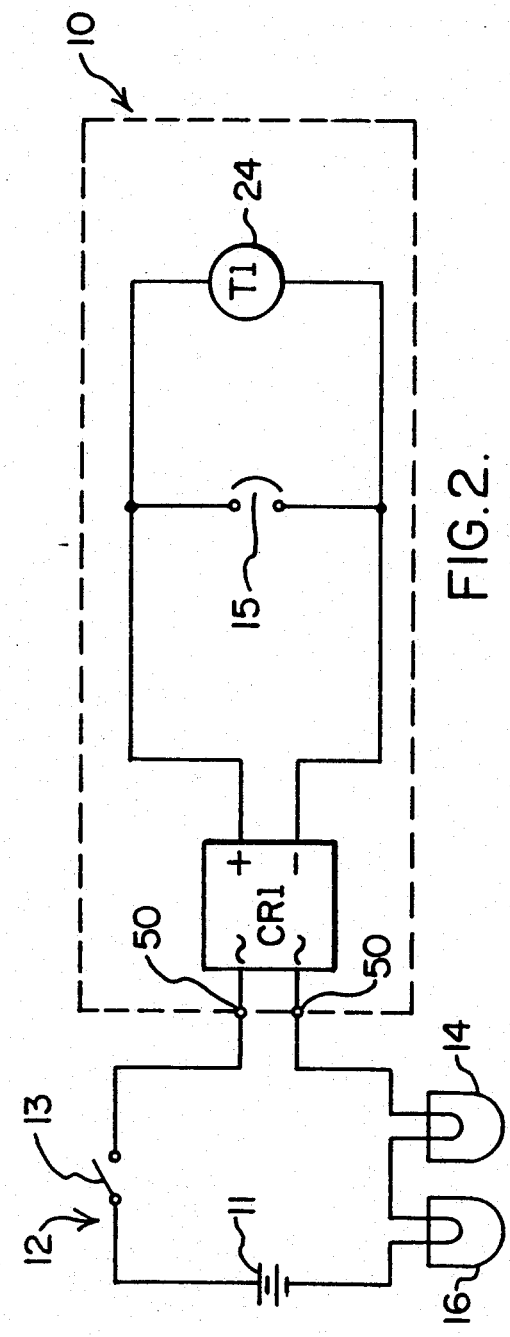
FIG. 2 is a schematic circuit diagram of an alternative form of the invention without time delay circuitry.

FIG. 2 is a simplified schematic diagram of an alternative embodiment in which the time delay circuitry has been omitted. The tone generator 24 is immediately activated whenever the bimetallic thermal switch 15 is opened and is deactivated when the switch is closed. The bimetallic thermal switch 15 can be replaced in this embodiment with a solid state switch that cyclically opens and closes without producing a click.

Figure 4:
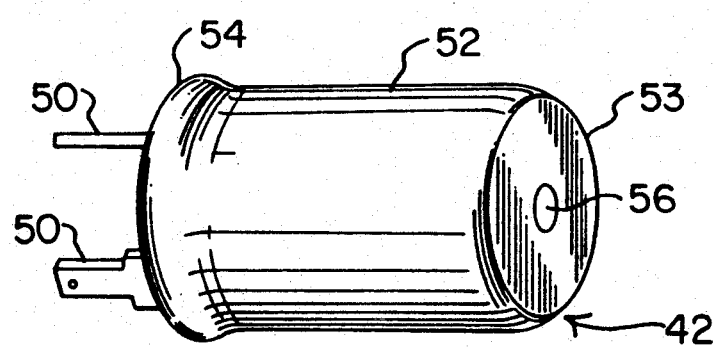
FIG. 4 is a perspective view of a canister for encapsulating the module of FIG. 3 so as to be insertable into the socket for the standard directional flasher unit of an automobile.
Figure 3:
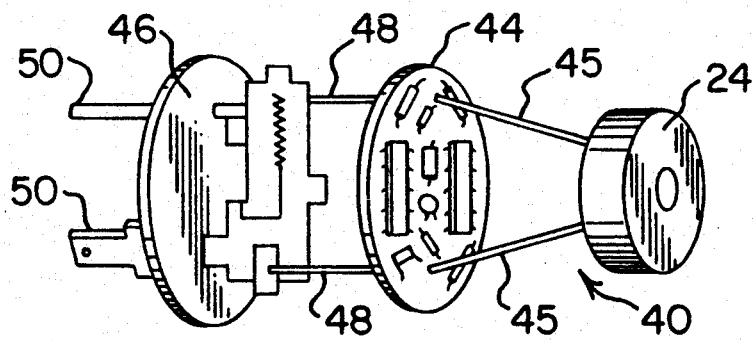
FIG. 3 is a perspective view of a preferred form of module incorporating the circuitry illustrated in FIG. 1.

It is possible to package either alternative embodiment of the unit as a self-contained unitary module 40, as shown in FIG. 3, installed within a canister or housing 42, as shown in FIG. 4. In the module 40, the alarm circuit 10 is assembled on a printed circuit board 44 with the exception of the tone generator 24 which is independently mounted and connected by means of conductive support wires 45 or by other means to the printed circuit board 44 and specifically into the analog switch IC2. In turn, the printed circuit board 44 is mounted in spaced relation to the bimetallic thermal switch 15, the latter assembled on an electrically insulating base 46. Electrical connection between the printed circuit module 44 and the thermal switch is via conductor wires 48 which could also serve to rigidly support the printed circuit board 44 with respect to the base 46. Two metal prongs 50 extend from the base 46 and serve as electrical connectors to mate with corresponding electrical contacts in a conventional plug-in socket provided for this purpose in the automobile. FIGS. 3 and 4 illustrate a two-prong installation. However, the invention can be adapted easily to more than two prongs to accommodate the flasher socket and wiring convention of substantially any type of vehicle. In this relation, it will be appreciated that the prongs 50 will establish connection into the car battery 11 and that the battery 11 and lamps 14 and 16 are not a physical part of the circuit within the canister housing 42. The compact mounting and arrangement of the alarm circuit 12 and thermal switch enable direct insertion into a canister 42 as illustrated in FIG. 4. In this version, the canister is of generally cylindrical configuration including a cylindrical wall 52 which is closed at one end 53 and flares outwardly at an opposite open end 54. The module 40 is inserted in an axial or lengthwise direction into the open end 54 of the canister 42 and may be permanently affixed by crimping the flared end 54 of the canister to the base 46. It will be evident that the module 40 may be varied in terms of the precise mounting and disposition of the printed circuit boards 44 and base 46 with respect to one another and in terms of the physical location of the components within the canister housing 42. For example, this may appropriately vary with the configuration of the canister which may be of a rectangular or square cross-sectional configuration. Also, the printed circuit boards 44 and base 46 may be oriented differently according to space and configuration requirements. For instance, the printed circuit board 44 may be of rectangular configuration and aligned perpendicular to the base 46; also, the tone generator 24 may be affixed directly to the printed circuit board 44 and is not necessarily spaced from the board as illustrated in FIG. 3. As further illustrated in FIG. 4, an opening 56 may be provided in the closed end 53 of the canister 42 for sound transmission.

In use, the canister 42 containing the module 40 is sized such that it can be used in direct substitution for a conventional flasher unit in an automobile. Thus, all that is necessary is to insert the prongs 50 into the existing socket provided for this purpose in the automobile. Whenever the turn signal lever on the steering column is engaged to indicate either a left or right turn, the switch 13 will be closed to complete the circuit into the normally closed thermal switch 15 thereby energizing the turn signal lamp 14. As the switch heats up, it will open and cause the turn signal lamp to turn off and, as it cools, will return to its normally closed position to turn on the lamp 14. The capacitor C1 charges when the thermal switch 15 is open and the diode CR3 prevents current flow from the capacitor C1 through the thermal switch 15 when the switch 15 is closed. The reset circuit R4 and C3 operates to assure that the counter will start from zero each time that the circuit is reactivated.

For the purpose of illustration and not limitation, the major components of the circuit are comprised as follows:

capacitor C1—22 $\mu$F
capacitor C2—0.01 $\mu$F
capacitor C3—0.1 $\mu$F
diodes CR2 and CR3—1N4148
resistor R1—56 K$\Omega$
resistor R2—10 K$\Omega$
resistor R3—100 K$\Omega$
resistor R4—10 K$\Omega$
integrated circuit IC1—4020 14-stage binary ripple counter
integrated circuit IC2—4066 quad bilateral switch
Tone generator 24—oscillator/transducer Model HMB12, manufactured and sold by Star Micronics America, Inc. of Piscataway, N.J.

In a moderate to high volume production situation, it might become economically justifiable to combine the functions provided by integrated circuits IC1 and IC2 in a single custom integrated circuit or an application specific integrated circuit ("ASIC"). This would reduce the number of integrated circuits from two to one and also eliminate the various wiring connections between IC1 and IC2, thereby saving space within the canister and reducing assembly costs.

It is therefore to be understood that while a preferred form of invention has been herein set forth and described, various modifications and changes may be made in the construction and arrangement of elements as well as their packaging without departing from the spirit and scope of the present invention as defined by the following claims and reasonable equivalents thereof.

We claim:

1. An audible turn signal unit for use in a motor vehicle having a series combination of an electrical power supply, a turn signal switch, at least one turn signal lamp, and a socket with at least two electrical contacts; said audible turn signal unit comprising:
   a housing having a portion adapted for removable insertion into said socket;
   two electrical connectors, each being adapted to make electrical contact with one of said socket contacts upon insertion of said housing into said socket;
   switch means connected between said electrical connectors within said housing for cyclically opening and closing at a predetermined temporal rate when said turn signal switch is closed; and
   tone generator means connected in parallel with said switch means within said housing for intermittently producing a substantially pure tone at a predetermined audible frequency in response to opening and closing of said switch means, said tone generator and said switch means having no external electrical connections other than said two electrical connectors.

2. The audible turn signal unit of claim 1, further comprising time delay circuit means for activation of said tone generator means at a predetermined time interval after said turn signal switch is closed.

3. The audible turn signal unit of claim 2, wherein said time delay circuit means comprise counter means to count the number of cycles of said switch means after said turn signal switch is closed and to activate said tone generator means after a predetermined count is reached.

4. The audible turn signal unit of claim 2, further comprising reset means for resetting said time delay circuit means when said turn signal switch is closed.

5. The audible turn signal unit of claim 1, wherein said tone generator means produces an audible tone at a predetermined frequency in the range of approximately 1000 Hz to 2500 Hz.

6. An audible turn signal unit for use in a motor vehicle having a series combination of an electrical power supply, a turn signal switch, at least one turn signal lamp, and a socket with at least two electrical contacts; said audible turn signal unit comprising:
   a housing having a portion adapted for removable insertion into said socket;
   two electrical connectors, each being adapted to make electrical contact with one of said socket contacts upon insertion of said housing into said socket;
   a switch connected between said electrical connectors within said housing adapted to cyclically open and close at a predetermined temporal rate when said turn signal switch is closed; and
   tone generator means connected in parallel with said switch within said housing capable of being activated to produce a substantially pure tone at a predetermined audible frequency in the range of approximately 1000 Hz to 2500 Hz.

7. The audible turn signal unit of claim 6, further comprising time delay circuit means for activation of said tone generator means at a predetermined time interval after said turn signal switch is closed.

8. The audible turn signal unit of claim 7, wherein said time delay circuit means comprise an electronic counter to count the number of cycles of said switch after said turn signal switch is closed and to activate said tone generator means after a predetermined count is reached.

9. The audible turn signal unit of claim 7, further comprising reset means for resetting said time delay circuit means when said turn signal switch is closed.

10. An audible turn signal unit for use in a motor vehicle having a series combination of an electrical power supply, a turn signal switch, at least one turn signal lamp, and a socket with two electrical contacts; said audible turn signal unit comprising:
    a housing having a portion adapted for removable insertion into said socket;

two electrical connectors, each being adapted to make electrical contact with one of said socket contacts upon insertion of said housing into said socket;

a switch connected between said electrical connectors within said housing adapted to cyclically open and close at a predetermined temporal rate when said turn signal switch is closed;

tone generator means capable of being activated to produce a substantially pure tone at a predetermined frequency in the range of approximately 1000 Hz to 2500 Hz;

counter means for counting the number of cycles of said switch and for activation of said tone generator means after a predetermined count is reached; and reset means for resetting said counter means when said turn signal switch is closed.

11. The audible turn signal unit of claim 10, further comprising power supply means including a capacitor for supplying power from said electrical connectors to said counter means and said tone generator means.

12. The audible turn signal unit of claim 10, further comprising a pulse-shaping network between said power supply means and said counter means.

* * * * *